April 6, 1965

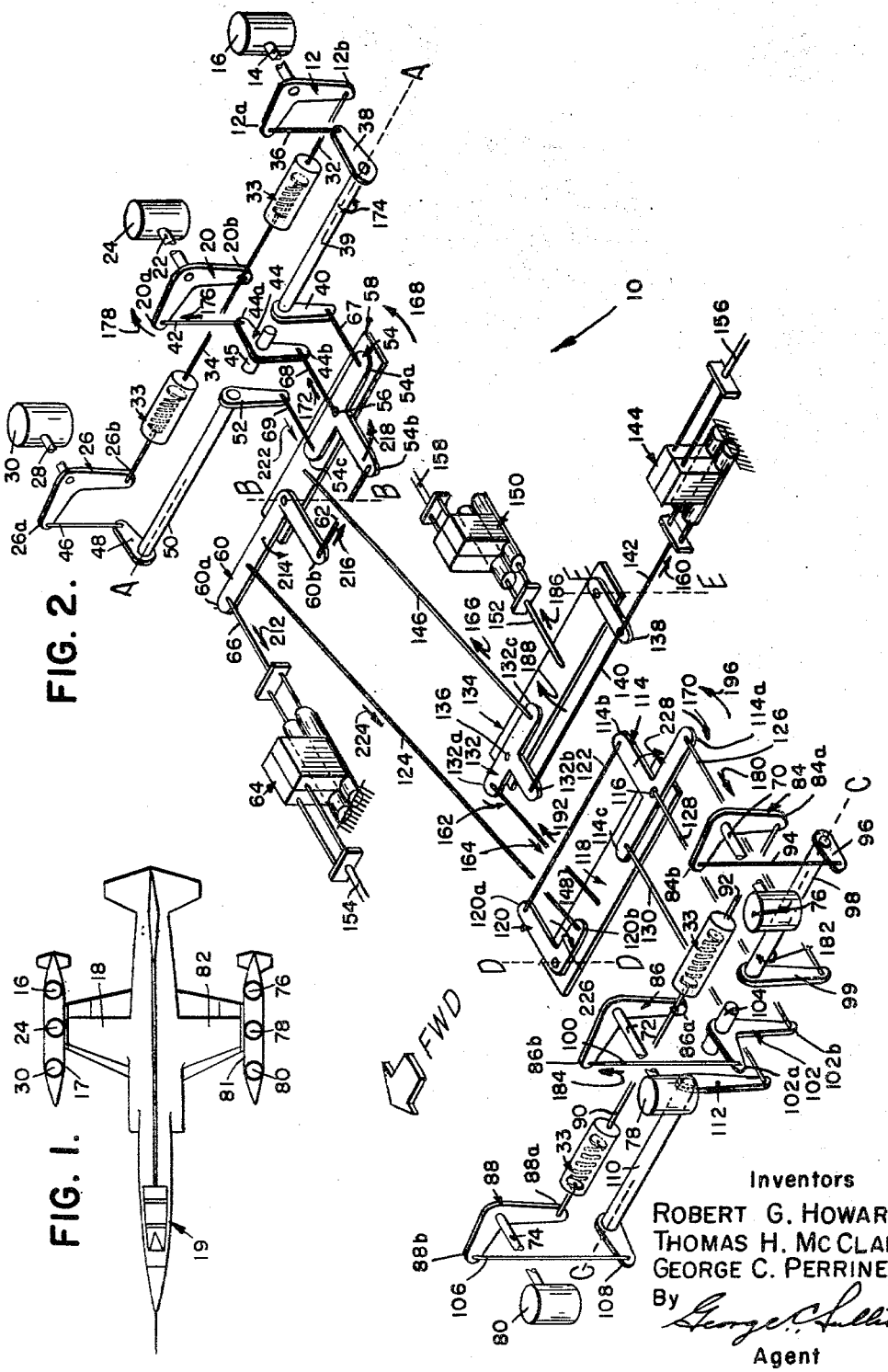

R. G. HOWARD ETAL 3,176,936

CONTROL SYSTEM FOR AIRCRAFT

Filed June 17, 1963

Inventors
ROBERT G. HOWARD
THOMAS H. MCCLAIN
GEORGE C. PERRINE
By
*George C. Sullivan*
Agent April 6, 1965 R. G. HOWARD ETAL 3,176,936
CONTROL SYSTEM FOR AIRCRAFT
Filed June 17, 1963 3 Sheets-Sheet 3

Inventors
ROBERT G. HOWARD
THOMAS H. MCCLAIN
GEORGE C. PERRINE
By
*George C. Sullivan*
Agent

United States Patent Office 3,176,936
Patented Apr. 6, 1965

3,176,936
CONTROL SYSTEM FOR AIRCRAFT
Robert G. Howard, Northridge, Thomas H. McClain, La Canada, and George C. Perrine, Burbank, Calif., assignors to Lockheed Aircraft Corporation, Los Angeles, Calif.
Filed June 17, 1963, Ser. No. 288,125
9 Claims. (Cl. 244—75)

The present invention relates to a control system and more particularly to a control system for regulating the thrust output of a plurality of engines in an airframe or the like, with a minimum number of control input motions.

In vertical take-off and landing (VTOL) aircraft of the type described in Patent No. 3,066,889, vertical thrust engines are mounted in a pod on each wing tip in a fore-to-aft row. The thrust output of these engines may be varied to control lift, roll and pitch by pilot-transmitted input commands which may be boosted by servomotors. Each input motion is proportional to the pilot's requested control effect, and may include simultaneous demands for such things as increased lift, left-wing-up roll and nose-down pitch or other combinations or opposites thereof. These input commands must be transmitted to the engines in varying degrees depending upon engine placement in the vehicle. Assuming that three vertical thrust engines are mounted on each wing tip, increased lift will be accomplished by advancing a power lever to increase the thrust on all engines by equal increments proportional to the command on all engines. To roll the left wing down, it is necessary to decrease the thrust on three left-wing engines and advance the thrust on three right-wing engines, each by an equal increment proportional to the command. To pitch the nose down, the center engine is left unaffected while the thrust on the forward two engines is decreased and the trust on the two aft engines is increased by equal increments proportional to the command.

When simultaneous commands exist, each engine must receive a command which combines the net sum of the individual input commands. This integration and distribution of input commands is accomplished by the mechanism of the present invention. Therefore, it is one of the objects of the present invention to provide a control system which produces output commands or motions equalling the algebraic sum of input commands or motions.

Another object of the present invention is to provide a control system for regulating thrust output of a plurality of engines in an airframe with a minimum number of control input motions.

Yet another object of the present invention is to provide a control system for regulating the thrust output of six or more engines on an aircraft which will distribute and apportion pitch, roll and lift commands to regulate the thrust selectively.

A further object of the present invention is to provide a control system for VTOL aircraft which apportions maneuver commands to appropriate engines selected for maximum effectiveness in accomplishing necessary maneuvers.

Yet a further object of the present invention is to provide a linkage mechanism which integrates and distributes output motions in accordance with the algebraic sum of a plurality of input motions.

According to the present invention, pilot commands in a VTOL aircraft in three control modes are reinforced by three separate servomechanisms to control pitch, roll and lift. The control system is designed for use in a vehicle having six vertical thrust engines with three of the engines mounted on each wing tip in a fore-to-aft row and integrates and distributes input signals received from the servomechanism in a predetermined manner to power levers on the engines. A system of bell cranks and levers is arranged in such a manner that the combined effect of all input signals places each engine at a thrust level consistent with the algebraic sum of the input signals.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIGURE 1 is a plan view of a VTOL aircraft which may employ the control system of the present invention;

FIGURE 2 is a perspective view of the control system of the present invention.

Figure 3:
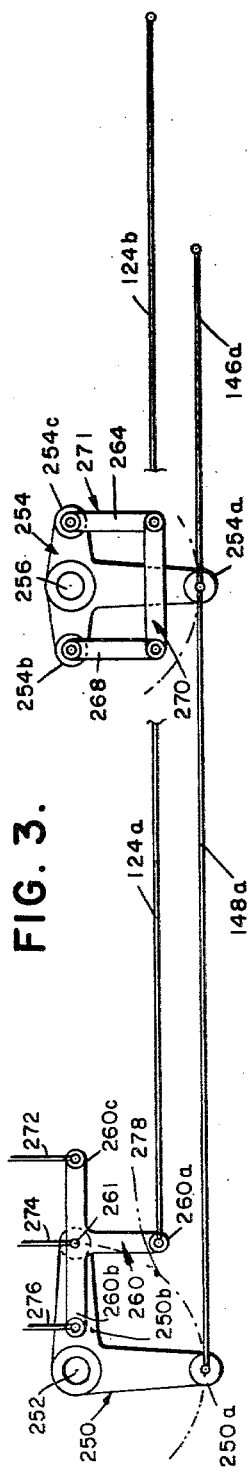
FIGURES 3–6 are diagrammatic views showing a modification of the system of FIGURE 1 in various operating positions.

Referring again to the drawings and particularly to FIGURES 1 and 2, the control system constituting the present invention, generally designated 10, (FIGURE 2) includes a first power lever 12 having arms 12a and 12b. The power lever 12 is connected through a shaft 14 to an engine 16. The engine 16 may constitute the aft engine which is mounted in a pod 17 on the right hand wing tip 18 of a VTOL aircraft 19 (FIGURE 1). A second power lever 20 having arms 20a and 20b is connected through a shaft 22 to the center engine 24 in the pod 17, and a third power lever 26 having arms 26a and 26b is connected through a shaft 28 to the forward engine 30 in pod 17.

A first transfer rod 32 includes a conventional, spring-biased override cartridge 33 and has one end pivotally connected to the arm 12b and its other end pivotally connected to the arm 20b. A second transfer rod 34 includes a cartridge 33 and has one end pivotally connected to the arm 20b and its other end pivotally connected to the arm 26b. The transfer rods 32 and 34 assure that the control levers 12, 20 and 26 travel uniformly together unless one lever is subjected to a restraining force exceeding the bias of the cartridges 33.

A push rod 36 connects arm 12a of power lever 12 to a bell crank 38 which is rigidly affixed to one end of a torque tube 39. A bell crank 40 is rigidly affixed to the other end of torque tube 39 and the torque tube is rotatable about a fixed axis A—A. A push rod 42 connects arm 20a of power lever 20 to a bell crank 44 which has first and second arms 44a and 44b and is rigidly affixed to a torque tube 45 which is also rotatable about the fixed axis A—A. A push rod 46 connects the arm 26a of power lever 26 to a bell crank 48 which is rigidly connected to one end of a torque tube 50 which is also rotatable about the fixed axis A—A. A bell crank 52 is rigidly affixed to the other end of torque tube 50.

A first T-shaped bell crank 54 has arms 54a, 54b and 54c and is pivotally mounted by means of a pin 56 on one end of a movable support member 58. The other end of the support member 58 is swingable about a fixed axis B—B about which a bell crank 60 is also swingable. The bell crank 60 includes arms 60a and 60b and the arm 60b is connected by means of a rod 62 to arm 54b. Arm 60b, rod 62, arm 54b and member 58 form a parallelogram. The arm 60a of bell crank 60 has its end connected to a pitch servomotor 64 by means of an output rod 66.

A rod 67 connects arm 54a of bell crank 54 to the bell crank 40, whereby rotary motion and translation of bell crank 54 is transmitted through arm 54a, rod 67, bell crank 40, torque tube 39, bell crank 38 and push rod 36 to arm 12a of bell crank 12 which, in turn, changes the thrust of engine 16. A rod 68 connects pin 56 to arm 44b of bell crank 44 so that power lever 20 will be unaffected by rotation of bell crank 54 but will be positioned by the translation of bell crank 54 by the swinging of support member 58 about axis B—B to change the thrust of center engine 24. A rod 69 connects arm 54c of bell crank 54 to bell crank 52 so that rotation and translation of bell crank 54 will position power lever 26 by transmitting a force through rod 69, bell crank 52, torque tube 50, bell crank 48, rod 46 and arm 26a.

On the opposite side of the control system a plurality of shafts 70, 72, and 74 control the thrust of aft engine 76, center engine 78 and fore engine 80, respectively, which are mounted in a pod 81 on the left hand wing 82 of aircraft 19 and are connected to power levers 84, 86 and 88, respectively. A transfer rod 90 includes a cartridge 33 and has one end connected to an arm 88a on power lever 88 and its other end connected to an arm 86a on power lever 86. A second transfer rod 92 includes a cartridge 33 and has one end connected to the arm 86a and its other end connected to arm 84a of power lever 84.

A push rod 94 connects an arm 84b on power lever 84 with a bell crank 96 which is rigidly affixed to one end of a torque tube 98. A bell crank 99 is rigidly affixed to the other end of torque tube 98 which is rotatable about a fixed axis C—C. A push rod 100 connects an arm 86b of power lever 86 to the arm 102a of a bell crank 102 which is rigidly affixed to a torque tube 104 which, in turn, also rotates about fixed axis C—C. A push rod 106 connects arm 88b of power lever 88 to a bell crank 108 which is rigidly affixed to a torque tube 110 having a bell crank 112 rigidly affixed to its other end. The torque tube 110 is also rotatable about the fixed axis C—C.

A second T-shaped bell crank 114 has arms 114a, 114b and 114c, respectively, and is pivotally mounted by means of a pin 116 on a second support member 118. The support member 118 is swingable about a fixed axis D—D about which a bell crank 120 having arms 120a and 120b is also swingable. A rod 122 connects the arm 120a with the arm 114b, thereby forming a parallelogram with arms 120a, 114b and support member 118. A pitch control rod 124 connects the arm 120b to the arm 60a intermediate its end and the axis B—B so that any pivoting of bell crank 60 about axis B—B will also pivot the bell crank 120 about its axis D—D. Pivoting of bell crank 120 transmits a force through rod 122 which pivots bell crank 114 and pivoting of bell crank 60 transmits a force through rod 62 which pivots bell crank 54.

A rod 126 connects arm 114a of pitch bell crank 114 to the bell crank 99 and transmits both rotation and translation of bell crank 114 to the power lever 84 through push rod 126, bell crank 99, torque tube 98, bell crank 96, push rod 94 and arm 84b. A push rod 128 connects pivot pin 116 to arm 102b of bell crank 102 and transmits a force to power lever 86 when bell crank 114 is translated by swinging support member 118 about axis D—D, but does not transmit a force to bell crank 86 when pitch bell crank 114 rotates about pivot pin 116. This force is transmitted by power lever 86 through rod 128, arm 102b, torque tube 104, arm 102a, push rod 100 and arm 86b. A rod 130 connects arm 114c of bell crank 114 to the bell crank 112 and transmits a force to power lever 86 when bell crank 114 is either rotated about pin 116 or translated. This force is transmitted through push rod 130, bell crank 112, torque tube 110, bell crank 108, push rod 106 and arm 88b.

A third T-shaped bell crank 132 includes arms 132a, 132b and 132c and is pivotally mounted on a support member 134 by means of a pivot pin 136. The support member 134 is swingable about a fixed axis E—E about which a floating link or bell crank 138 is also swingable. A rod 140 connects arm 132b of bell crank 132 to the bell crank 138 to form a parallelogram with member 134, bell crank 138 and arm 132b. An output rod 142 connects bell crank 138 to a lift servomotor 144. A first lift-roll control rod 146 connects arm 132c of bell crank 132 to the support member 58 and a second lift-roll control rod 148 connects the arm 132a of bell crank 132 to the second support member 118. A roll servomotor 150 is connected to the support member 134 by means of an output rod 152.

The pitch servomotor 64, the lift servomotor 144 and the roll servomotor 150 receive suitable command signals by the positioning of input rods 154, 156 and 158, respectively, which may be connected to suitable pilot-controlled levers, not shown.

Operation of the control system of the present invention will be readily understood. It is known that the power levers on all engines must be advanced by an equal increment proportional to the thrust required by all engines to impart an increased lift to the aircraft 19. It is also known that in order to roll the left-hand wing down it is necessary to decrease the thrust on the three left-hand engines 76, 78 and 80 and advance the thrust on the three right-hand engines 16, 24 and 30, each by an equal increment proportional to a command signal. It is further known that the nose of aircraft 19 is pitched down by leaving the center engine on each wing unaffected while the power is decreased on the forward two engines 30 and 80 and increased on the two aft engines 16 and 76 by equal increments proportional to a command signal.

Assume that a command signal has been supplied through the input rod 156 to the lift servomotor 144 calling for an increase in lift of a magnitude which makes it necessary to advance all power levers by 20 degrees. This will cause the rods 140 and 142 to move in the direction of arrow 160 a predetermined amount rotating bell crank 132 in the direction of arrow 162. Arm 132a moves lift-roll rod 148 in the direction of arrow 164 and arm 132c moves rod 146 in the direction of the arrow 166 to move the pins 56 and 116 by swinging support members 58 and 118 about fixed axes B—B and D—D in the direction of arrows 168 and 170, respectively. Bell cranks 54 and 114, while moving in substantially a translatory motion, are restrained from rotation by the rods 62 and 122, respectively, which are held in a fixed position by the pitch servomotor 64 through rod 66, bell crank 60, rod 124 and bell crank 120. Translation of bell crank 54 in the direction of arrow 168 moves rods 67, 68 and 69 in the direction of arrows 172 to swing bell cranks 40, 44 and 52, respectively, about axis A—A. This rotates torque tubes 39, 45 and 50 in the direction of arrows 174, swinging bell cranks 38, 44 and 48 in such a manner that they move push rods 36, 42 and 46, respectively, in the direction of arrows 176. This rotates power levers 12, 20 and 26 in the direction of arrow 178 to increase the thrust of engines 16, 24 and 30, respectively.

Translation of bell crank 114 in the direction of arrow 170 moves rods 126, 128 and 130 in the direction of arrow 180 swinging bell cranks 99, 102 and 112, respectively, in such a manner that they rotate torque tubes 98, 104 and 110 in the direction of arrow 182. This swings bell crank 96, arm 102a and bell crank 108 in a direction which causes push rods 94, 100 and 106, respectively, to move in the direction of arrow 184. This rotates power levers 84, 86 and 88 in such a manner that they increase the thrust of engines 76, 78 and 80, respectively.

Assuming also that the roll servomotor 150 simultaneously or subsequently received a command signal through input signal rod 158 of a value equivalent to 8 degrees of power lever angle to roll the left wing down, the servomotor 150 will move rod 152 in the direction of arrow 186 a predetermined amount which swings bell crank 132 in an arc about axis E—E. This causes pin 136 to be essentially translated in the direction of arrow 188 through a predetermined arc without rotation of bell crank 132 because of its connection to lift servomotor 144 through arm 132b, rod 140, floating link 138 and rod 142. The translation of bell crank 132 moves rods 146 and 148 to the right in the direction of arrows 166 and 192, respectively, causing support members 58 and 118 to swing about axes B—B and D—D in the direction of arrows 168 and 196, respectively, translating bell cranks 54 and 114 in the same directions. During this translation, the bell crank 54 is prevented from rotating by the pitch servomotor 64, through arm 54b, rod 62 and 66 and bell crank 60, as is bell crank 114 through arm 114b, rod 122, bell crank 120 and rods 124 and 66 and bell crank 60. Translation of the bell crank 54 in the direction of arrow 168 moves rods 67, 68 and 69 to the right, ultimately increasing the thrust of the engines 16, 24 and 30 as explained above.

Translation of bell crank 114 in the direction of arrow 196 moves rods 126, 128 and 130 to the right in the direction opposite of arrow 180, ultimately decreasing the thrust of the engines 76, 78 and 80 by moving the interconnecting components opposite the directions indicated above. It is to be noted that the overall effect of the command signal on the roll servomotor 150 is to augment the lift command on the right hand engines 16, 24 and 30 for a combined power lever angle of 20+8=28° while reducing the power lever angle on the left hand engines 76, 78 and 80 for a resultant power lever angle of 20−8=12°.

Assuming further that simultaneously with or subsequently to the giving of the command signal to the roll servomotor 150 and the lift servomotor 144, a command signal is given to the pitch servomotor 64 equivalent to 5° of power lever angle to pitch the nose of the aircraft 19 down. This command signal is supplied to the servomotor 64 through input rod 154 and causes the servomotor to move output rod 66 to the left in the direction of arrow 212 pivoting bell crank 60 about its axis B—B in the direction of arrow 214. Arm 60b moves rod 62 in the direction of arrow 216 imparting a force to arm 54b which pivots bell crank 54 about pin 56 in the direction of arrow 218 without translation. This rotation of bell crank 54 causes rod 67 to move to the right in the direction of arrow 172 and rod 69 to move to the left in the direction of arrow 222. Since bell crank 54 has not been translated and since rod 68 is connected to pivot pin 56, rod 68 will remain stationary. Moving rod 67 to the right and rod 69 to the left increases the thrust of aft engine 16 through linkage actuation as heretofore indicated and decreases the thrust of forward engine 30 movements of those linkages in the opposite direction. The thrust of center engine 24 remains unchanged.

The swinging of bell crank 60 in the direction of arrow 214 also causes rod 124 to move to the left in the direction of arrow 224 rotating bell crank 120 in the direction of arrow 226 which, in turn, causes rod 122 to rotate bell crank 114 in the direction of arrow 228. This causes arm 114a to move rod 126 to the left in the direction of arrow 180 and causes arm 114c to move rod 130 to the right in the opposite direction. Since rod 128 is connected to pin 116 which remains in a fixed position as bell crank 114 rotates, the rod 128 does not move. The movement of rod 126 rotates torque tube 98 in the direction of arrow 182. This causes bell crank 96 to swing upwardly moving push rod 94 vertically in the direction of arrow 184 which rotates power lever 84 in such a manner that the thrust of aft engine 76 is increased. The noted movement of rod 130 causes bell crank 112, through its interconnected linkage, decreases the thrust of forward engine 80. The thrust of the center engine 78 remains unchanged.

Thus, it is seen that a command signal to pitch servomotor 64 to pitch the nose of aircraft 19 down resulted in an increase in the thrust of the aft engines 16 and 76 and a decrease in the thrust of forward engines 30 and 80 while the center engines 24 and 78 remain unchanged. This creates a twisting movement about an imaginary transverse axis extending through the engines 24 and 78 which noses the airplane 19 down. The rear engines were advanced 5° each and the forward engines were retarded 5° each.

The following table recapitulates the signals assumed above and shows the net effects on each of the engines:

|  | Fwd. Engines | | Center Engines | | Aft Engines | |
|---|---|---|---|---|---|---|
|  | L | R | L | R | L | R |
| 20° Lift | +20 | +20 | +20 | +20 | +20 | +20 |
| 8° Roll LWD | −8 | +8 | −8 | +8 | −8 | +8 |
| Net | +12 | +28 | +12 | +28 | +12 | +28 |
| 5° Pitch N.D. | −5 | −5 | 0 | 0 | +5 | +5 |
| Net | +7 | +23 | +12 | +28 | +17 | +33 |

The above table demonstrates that each engine is placed at an operating level corresponding to the alebraic sum of three input command signals.

In an airframe maneuver, the pilot's demand for control in pitch and roll may be of greater priority than the demand for lift or altitude correction. Since the output of the control system of the present invention is an additive algebraic sum of the inputs, extreme maneuver commands, when combined, may exceed the capacity of the engine power lever to respond. Thus, in the operating examples given above, the power lever for the right hand, aft engine may be requested to move 33°. If the lever travel in its upper limit allows only a 29° travel, the minus 4° discrepancy is algebraically added to all engines, thus allowing the full pitch and roll commands to be applied during the momentary period of heavy maneuver demand. The spring cartridges 33 prevent damage to the power levers and intervening rods by absorbing the excess motion which is beyond the travel limit of the power lever.

It is to be noted that in the control system described above in connection with FIGURE 2 the bell cranks 132, 54 and 114 are mounted to both rotate and translate in a horizontal plane and that the pitch control and the lift-roll rods 124, 148 and 146 are also mounted in a horizontal plane. In some installations, it may be desirable to have one of these rods operate in a horizontal plane while one or more of the bell cranks translate in a vertical plane. A control system for accomplishing this result is shown schematically in FIGURES 3–6.

In the system shown in FIGURE 2, the lift-roll rod 148 has one end connected to support member 118 mounted to rotate in a horizontal plane about a vertical axis D—D and its other end connected to one arm of a bell crank 132 having three arms and mounted to rotate in a horizontal plane on support member 134 which, in turn, is rotatable about a vertical axis E—E. The lift-roll rod 146 has one end connected to another arm of bell crank 132 and its other end connected to the support 58 which is rotatable in a horizontal plane about the vertical axis B—B. In the system shown in FIGURES 3–6, on the other hand, a lift-roll rod 148a has one end pinned to the lower end of an arm 250a which extends vertically to a horizontal pin 252 and which forms an integral part of a bell crank 250 having a second arm 250b disposed at right angles to the arm 250a. The bell crank 250 replaces a horizontal support member, such as the one shown at 118 in FIGURE 2. The other end of the lift-roll rod 148a is pinned to the end of an arm 254a of a T-shaped bell crank 254 which is rotatably mounted in a horizontal plane on a vertical pin 256. The lift-roll rod 146a has one end pinned to the arm 254a and its other end pinned to a bell crank (not shown) which may be identical with the bell crank 250. A first pitch control rod 124a has one of its ends pinned to the lower end of a leg 260a of T-shaped bell crank 260 which is rotatably mounted on a pin 261 on the arm 250b of bell crank 250 in such a manner that the leg 260a depends from arm 250b. The other end of rod 124a is pinned to a first link 264 which has its other end pinned to the outboard end 254c of the cross-bar on T-shaped bell crank 254. The pitch rod 124b has one end pinned to a second link 268 which has its other end pinned to the outboard end 254b of the cross-bar on T-shaped bell crank 254. The opposite end of the pitch rod 124b may be pinned to a T-shaped bell crank (not shown) identical to the T-shaped bell crank 260. A third link 270 has one end pinned at the connection between rod 124a and link 264 and its other end pinned to the common connection between the link 268 and rod 124b, whereby the cross-bar of T-shaped bell crank 254, and the links 264, 268 and 270 form a parallelogram 271 which is pinned at all four corners.

A first push rod 272 has one end pinned to the end 260c of the cross-bar on T-shaped bell crank 260 and its other end may be connected to the power lever of an aft engine (not shown). A second push rod 274 has one end connected to the pin 261 connecting bell crank 260 to the outboard end of arm 250b and its other end may be connected to a center engine (not shown). A third push rod 276 has one end pinned to the outboard end 260b of the cross-bar on T-shaped bell crank 260 and its other end may be connected to a forward engine (not shown). It will be remembered from the description in connection with the control system of FIGURE 2, that the bell crank 260 must be capable of being translated to move the rods 272, 274 and 276 uniformly, vertically to control all three engines an equal amount for lift and roll and that the bell crank 260 must also be capable of rotation about the pin 261 so that the rods 272 and 276 will be moved to change the thrust of the aft and the forward engines (not shown) while rod 274 remains fixed so that the center engine is unaffected. Translation of the bell crank 260 is accomplished through lift-roll rod 148a.

Figure 4:
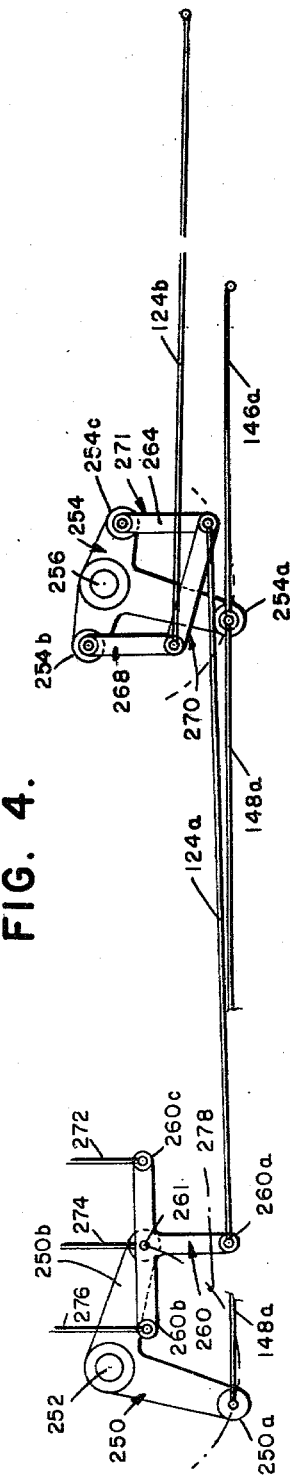
Figure 5:
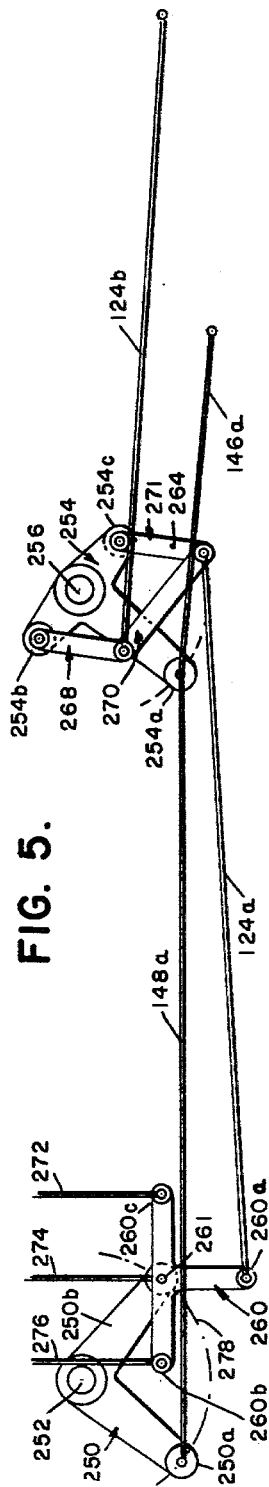
Figure 6:
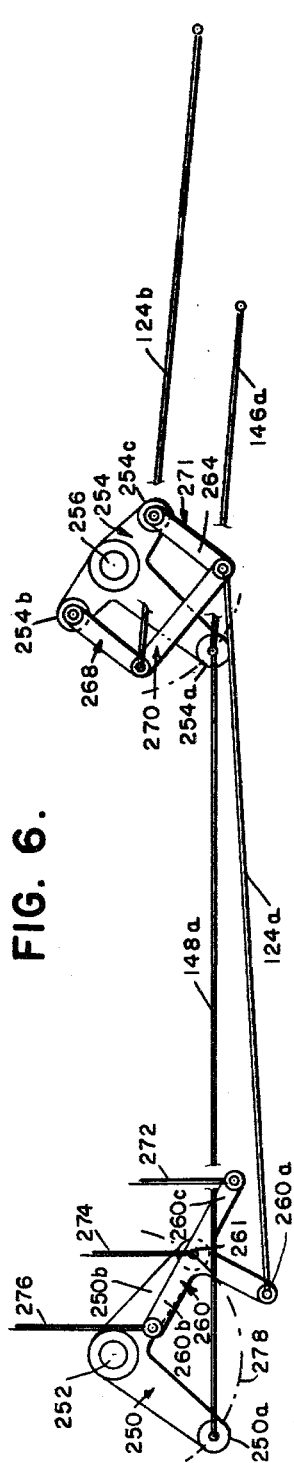

It is to be noted in FIGURES 4, 5 and 6 that as the bell crank 250 is rotated by lift-roll rod 148a, the pin 261 is translated along an arc 278 making it necessary for the pitch control rod 124a to change its length during the translation of pin 261 in order to maintain the amount of vertical movement of push rods 272, 274 and 276 equal. This is accomplished by the parallelogram 271.

In FIGURE 3, all controls are at their mid point so that the pitch control rod 124a and the pitch control rod 124b overlap each other an equal amount and the parallelogram 271 is of a rectangular shape.

In FIGURE 4, the controls have been positioned so that the lift-roll rod 148a and the pitch control rod 124a have positioned their respective bell cranks at their midpoint of travel. The parallelogram 271 is no longer rectangular, but is somewhat diamond shaped thereby shortening the effective length of pitch control rod 124a so that, as pin 261 continues to translate along arc 278, the lower end of leg 260a will translate along a straight line.

In FIGURE 5, the control has been moved to position the lift input to its full travel and the roll input to its full travel while the pitch remained at midpoint. Now the parallelogram 271 has assumed a more drastic diamond shape thereby further shortening rod 124a so that the lower end of leg 260a will continue to travel along a straight line while pin 261 continues to travel along arc 278. Thus, the effective length of each rod, 272, 274 and 276, remains equal.

In FIGURE 6, the lift and roll controls are still in their maximum throw and the pitch rod 124a has been moved to its maximum throw. Now the parallelogram 271 has assumed a substantially rectangular shape again to effectively lengthen rod 124a so that bell crank 260 will be swung about pin 261 to change the effective length of push rods 272 and 276 while maintaining the effective length of push rod 274 as it was before.

It will be seen from the foregoing that the parallelogram 271 constitutes a link length compensating mechanism which corrects geometric errors appearing in the position of bell crank 260 due to the simultaneous input of different commands. This is accomplished by the lateral translation of the bell crank 260 while its connecting pin 261 moves in an arc.

While the particular control system herein shown and described in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

We claim:

1. A control system for producing a plurality of output motions which is the algebraic sum of a plurality of input motions comprising:
   (a) first force transmitting means rotatably mounted on a fixed axis, said first force transmitting means being rotated about said fixed axis when subjected to a first input force;
   (b) second force transmitting means rotatably mounted and said fixed axis, said second force transmitting means being normally positioned at a predetermined angle to said first force transmitting means;
   (c) a bell crank rotatably mounted on said first force transmitting means, said bell crank having a plurality of arms, one of said arms being normally positioned parallel to said second force transmitting means;
   (d) first rod means connecting said second force transmitting means to said one arm of said bell crank for maintaining their parallel relationship when they are rotated due to a second input force;
   (e) second rod means connected to the pivot point of said bell crank for transmitting a first output force when said first force transmitting means is rotated about said fixed axis; and
   (f) third rod means connected to another arm of said bell crank for transmitting a second output force when said first force transmitting means is rotated about said fixed axis and a third output force when said bell crank is rotated about its pivot point.

2. A control system for producing a plurality of output motions which is the algebraic sum of a plurality of input motions comprising:
   (a) a support member pivotally mounted on a fixed axis, said support member being rotated about said fixed axis when subjected to a first input motion;
   (b) a link pivotally mounted on said fixed axis, said link being normally positioned at an approximate right angle to said support member;
   (c) a bell crank rotatably mounted on said support member, said bell crank having a plurality of arms, one of said arms being normally positioned at an approximate right angle to said support member;
   (d) first means connecting said link to said one arm of said bell crank for maintaining said link and said one arm of said bell crank in parallel positions when rotated by a second input motion;
   (e) second means connected to the pivot point of said bell crank for transmitting a first output motion when said support member is rotated about said fixed axis; and
   (f) third means connected to another arm of said bell crank for transmitting a second output motion when said support member is rotated about said fixed axis and a third output motion when said bell crank is rotated about its pivot point.

3. The control system of claim 2 including fourth means connected to a third arm of said bell crank for transmitting a fourth output motion when said bell crank is rotated about its pivot point.

4. A control system for producing a plurality of output motions which is the algebraic sum of a plurality of input motions comprising:
  (a) a first support member pivotally mounted on a first fixed axis, said support member being rotated about said first fixed axis when subjected to a first input motion;
  (b) a link pivotally mounted on said first fixed axis, said link being normally positioned at right angles to said first support member;
  (c) a first bell crank rotatably mounted on said first support member, said first bell crank having a plurality of arms, one of said arms of said first bell crank being normally positioned at right angles to said first support member;
  (d) a first rod connecting said link to said one arm of said first bell crank, said first rod maintaining said link and said one arm of said first bell crank in parallel positions, whereby said link and said first bell crank will pivot through equal arcs when subjected to a second input motion;
  (e) first input means connected to said first support member for subjecting it to said first input motion;
  (f) second input means connected to said first rod for subjecting said link and said first bell crank to said second input motion;
  (g) a second support member pivotally mounted on a second fixed axis, said second support member being rotated about said second fixed axis when subjected to either of said first and second input motions, a second link pivotally mounted on said second fixed axis, said second link being normally positioned at right angles to said second support member;
  (h) a second bell crank rotatably mounted on said second support member, said second bell crank having a plurality of arms, one of said arms of said second bell crank being normally positioned at right angles to said second support member;
  (i) a second rod connecting said second link to said one arm of said second bell crank, said second rod maintaining said second link and said one arm of said second bell crank in parallel positions, whereby said second link and said second bell crank will pivot through equal arcs when subjected to a third input motion;
  (j) a third input means connected to said second rod for subjecting said second link and said second bell crank to said third input motion;
  (k) a third rod connected to the pivot point of said second bell crank for transmitting a first output motion when said support member is rotated about said second fixed axis:
  (l) a fourth rod connected to another arm of said second bell crank for transmitting a second output motion when said support member is rotated about said fixed axis and a third output motion when said bell crank is rotated about its pivot point; and
  (m) a fifth rod connected to a third arm of said second bell crank for transmitting a fourth output motion when said second bell crank is rotated about its pivot point and a fifth output motion when said support member is rotated about said fixed axis.

5. The control system of claim 4 including:
  (a) a third support member pivotally mounted on a third fixed axis, said third support member being rotated about said third fixed axis when subjected to either of said first and second input motions;
  (b) a sixth rod connecting said third support member to a third arm on said first bell crank for transmitting said second input motion to said third support member;
  (c) a third link pivotally mounted on said third fixed axis, said third link being normally positioned at right angles to said third support member;
  (d) a third bell crank rotatably mounted on said third support member, said third bell crank having a plurality of arms, one of said arms on said third bell crank being normally positioned at right angles to said third support member;
  (e) a seventh rod connecting said third link to said one arm of said third bell crank, said seventh rod maintaining said third link and said one arm of said bell crank in parallel positions, whereby said third link and said third bell crank pivot through equal arcs when subjected to a third input motion;
  (f) an eighth rod connecting said third link to said second link for transmitting said third input motion from said second link to said third link;
  (g) a ninth rod connected to the pivot point of said third bell crank for transmitting a fifth output motion when said third support member is rotated about said third fixed axis;
  (h) a tenth rod connected to another arm of said third bell crank for transmitting a sixth output motion when said third support member is rotated about said third fixed axis and a seventh output motion when said third bell crank is rotated about its pivot point; and
  (i) an eleventh rod connected to a third arm of said third bell crank for transmitting an eighth output motion when said third bell crank is rotated about its pivot point and a ninth output motion when said third support member is rotated about said third fixed axis.

6. A control system for producing a plurality of output motions which is the algebraic sum of a plurality of input motions comprising:
  (a) a first bell crank pivotally mounted on a fixed axis, said first bell crank having first and second arms mounted at right angles to each other;
  (b) a second bell crank pivotally mounted on one end of one of said arms of said first bell crank, said second bell crank having a plurality of arms extending from its pivot point, one of said arms of said second bell crank extending at right angles to the other of said arms;
  (c) a third bell crank pivotally mounted to rotate about a fixed axis, said third bell crank having a plurality of arms with at least one arm being at right angles to the remaining arms;
  (d) a first link pinned to the outboard end of one of said remaining arms;
  (e) a second link pinned to the outboard end of another of said remaining arms;
  (f) a third link pivotally connecting the ends of said first and second links which are remote from said remaining arms, said remaining arms and said links forming a parallelogram;
  (g) a first rod connecting a corner of said parallelogram which is remote from said remaining arms to the end of said arm of said second bell crank which is at right angles to its other arms;
  (h) a second rod connecting the free end of said third bell crank with the other arm of said first bell crank;
  (i) a third rod connected to the pivot point of said second bell crank for transmitting a first output motion when said first bell crank is rotated about said fixed axis;
  (j) a third rod connected to a second arm of said second bell crank for transmitting a second output motion when said first bell crank is rotated about said fixed axis and a third output motion when said second bell crank is rotated about its pivot point; and
  (k) a fourth rod connected to a third arm of said second bell crank for transmitting a fourth output motion when said second bell crank is rotated about its pivot point and a fifth output motion when said first bell crank is rotated about said fixed axis.

7. In a VTOL aircraft having a plurality of vertical thrust engines, a mechanism for controlling the thrust output of said engines comprising:

(a) first force transmitting means rotatably mounted on a fixed axis in said aircraft, said first force transmitting means being rotated about said fixed axis when subjected to a first input force;

(b) second force transmitting means rotatably mounted on said first force transmitting means, said second force transmitting means being rotated when subjected to a second input force;

(c) first means connecting the pivot point of said second force transmitting means to one of said engines for changing the thrust thereof when said first force transmitting means is rotated about said fixed axis by said first input force; and (d) second means connecting said second force transmitting means to another of said engines for selectively changing the thrust thereof when said first force transmitting means is rotated about said fixed axis and when said second force transmitting means is rotated.

8. The mechanism of claim 7 including third means connecting said second force transmitting means to a third of said engines for selectively changing the thrust thereof when said first force transmitting means is rotated about said fixed axis and when said second force transmitting means is rotated.

9. In a VTOL aircraft having first and second pluralities of thrust engines mounted on left and right hand wing tips, a mechanism for controlling the thrust of said engines comprising:

(a) a first force transmitting member rotatably mounted on a first fixed axis in said aircraft, said first force transmitting member being rotated about said first axis when subjected to a first input force;

(b) a first bell crank rotatably mounted on said first force transmitting member, said first bell crank having a plurality of arms and being rotatable by a second input force;

(c) a second force transmitting member rotatably mounted on a second fixed axis in said aircraft, said second force transmitting member being rotated about said second axis by rotation of said first support member and by rotation of said first bell crank;

(d) a second bell crank rotatably mounted on said second force transmitting member, said second bell crank having a plurality of arms and being rotatable by a third input force;

(e) first means connecting the pivot point of said second bell crank to a first engine on said right hand wing for changing the thrust of said first right hand engine when said second force transmitting member is rotated;

(f) second means connecting one arm of said second bell crank to a second of said engines on said right hand wing for selectively changing the thrust of said second right hand engine when said second force transmitting member is rotated and when said second bell crank is rotated;

(g) third means connecting a second arm of said second bell crank to a third of said engines on said right hand wing for selectively changing the thrust of said third right hand engine when said second force transmitting member is rotated and when said second bell crank is rotated;

(h) a third force transmitting member rotatably mounted on a third fixed axis in said aircraft, said third force transmitting member being rotated about said third axis by rotation of said first support member and by rotation of said first bell crank;

(i) a third bell rotatably mounted on said third force transmitting member, said third bell crank having a plurality of arms and being rotatable by said third input force;

(j) fourth means connecting the pivot point of said third bell crank to a first engine on said left hand wing for changing the thrust of said first left hand engine when said third force transmitting member is rotated;

(k) fifth means connecting one arm of said third bell crank to a second of said engines on said left hand wing for selectively changing the thrust of said second left hand engine when said third force transmitting member is rotated and when said third bell crank is rotated;

(l) sixth means connecting a second arm of said third bell crank to a third of said engines on said left hand wing for selectively changing the thrust of said third left hand engine when said third force transmitting member is rotated and when said third bell crank is rotated;

(m) seventh means connecting said first force transmitting member to said first input force;

(n) eighth means connecting one arm of said first bell crank to said second input force;

(o) ninth means connecting third arms of said second and third bell cranks to said third input force;

(p) a first rod connecting a second arm of said first bell crank to said second force transmitting member; and (q) a second rod connecting a third arm of said first bell crank to said third force transmitting member.

References Cited by the Examiner
UNITED STATES PATENTS
3,077,934  2/63  Hartswick _____ 170—160.25

FERGUS S. MIDDLETON, *Primary Examiner.*
ANDREW H. FARRELL, *Examiner.*